United States Patent
Modarresi et al.

(10) Patent No.: US 11,182,804 B2
(45) Date of Patent: Nov. 23, 2021

(54) SEGMENT VALUATION IN A DIGITAL MEDIUM ENVIRONMENT

(71) Applicant: Adobe Inc., San Jose, CA (US)

(72) Inventors: Kourosh Modarresi, Los Altos, CA (US); Jamie Mark Diner, Pittsburgh, PA (US); Elizabeth T. Chin, Westfield, NJ (US); Aran Nayebi, Palo Alto, CA (US)

(73) Assignee: Adobe Inc., San Jose, CA (US)

(*) Notice: Subject to any disclaimer, the term of this patent is extended or adjusted under 35 U.S.C. 154(b) by 756 days.

(21) Appl. No.: 15/354,944

(22) Filed: Nov. 17, 2016

(65) Prior Publication Data

US 2018/0137522 A1 May 17, 2018

(51) Int. Cl.
| | | |
|---|---|---|
| G06N 20/00 | (2019.01) | |
| G06N 20/20 | (2019.01) | |
| G06Q 30/02 | (2012.01) | |
| G06N 5/00 | (2006.01) | |

(52) U.S. Cl.
CPC ......... *G06Q 30/0201* (2013.01); *G06N 5/003* (2013.01); *G06N 20/00* (2019.01); *G06N 20/20* (2019.01); *G06Q 30/02* (2013.01); *G06Q 30/0202* (2013.01); *G06Q 30/0269* (2013.01)

(58) Field of Classification Search
CPC combination set(s) only.
See application file for complete search history.

(56) References Cited

U.S. PATENT DOCUMENTS

| 8,255,346 | B2* | 8/2012 | Abe | G06N 7/005 |
| | | | | 706/15 |
| 8,386,574 | B2* | 2/2013 | Chidlovskii | H04L 51/32 |
| | | | | 709/206 |
| 10,318,874 | B1* | 6/2019 | Duncan | G06N 20/20 |
| 10,949,770 | B2* | 3/2021 | Hohwald | G06N 20/00 |
| 2003/0176931 | A1* | 9/2003 | Pednault | G06K 9/6219 |
| | | | | 700/31 |
| 2007/0239581 | A1* | 10/2007 | Eder | G06Q 40/06 |
| | | | | 705/36 R |

(Continued)

OTHER PUBLICATIONS

Kok Wai Wong, Chun Che Fung, T. Gedeon and D. Chai, "Intelligent data mining and personalisation for customer relationship management," ICARCV 2004 8th Control, Automation, Robotics and Vision Conference, 2004., 2004, pp. 1796-1801 vol. 3, doi: 10.1109/ICARCV.2004.1469431. (Year: 2004).*

(Continued)

*Primary Examiner* — Crystol Stewart
(74) *Attorney, Agent, or Firm* — FIG. 1 Patents

(57) ABSTRACT

Segment valuation techniques usable in a digital medium environment are described. To do so, a segment valuation system first identifies the attributes that are significant in achievement of a desired metric (e.g., conversion) and then values segments based on those significant attributes. Attributes are selected from the trained model based on significance of those attributes towards achieving the desired metric. A valuation of a segment may then be calculated based on the valuations of these attributes. For example, inclusion of the selected attributes within a segment, and the valuations of those selected attributes, is then used by the segment valuation system to generate data describing a value of the segment towards achieving the metric.

20 Claims, 6 Drawing Sheets

(56) References Cited

U.S. PATENT DOCUMENTS

| | | | | |
|---|---|---|---|---|
| 2008/0288889 A1* | 11/2008 | Hunt | .................. | G06Q 30/02 715/810 |
| 2009/0089274 A1* | 4/2009 | Chapelle | ............... | G06F 16/951 |
| 2011/0191141 A1* | 8/2011 | Thompson | ......... | G06Q 30/0202 705/7.32 |
| 2013/0006991 A1* | 1/2013 | Nagano | .................. | G06F 16/41 707/737 |
| 2013/0218824 A1* | 8/2013 | Wang | .................. | G06N 5/043 706/46 |
| 2013/0254787 A1* | 9/2013 | Cox | ...................... | G06Q 30/02 725/13 |
| 2014/0046777 A1* | 2/2014 | Markey | ............. | G06Q 30/0269 705/14.66 |
| 2015/0081389 A1* | 3/2015 | Dereszynski | ...... | G06Q 30/0204 705/7.33 |
| 2015/0178626 A1* | 6/2015 | Pielot | .................... | G06N 20/00 706/12 |
| 2015/0379429 A1* | 12/2015 | Lee | ........................ | G06N 20/00 706/11 |
| 2015/0379430 A1* | 12/2015 | Dirac | ..................... | G06N 20/00 706/12 |
| 2016/0148120 A1* | 5/2016 | Takahashi | ............... | G06K 9/00 706/12 |
| 2016/0203509 A1* | 7/2016 | Sharp, III | .......... | G06Q 30/0244 705/14.43 |
| 2016/0210657 A1* | 7/2016 | Chittilappilly | ..... | G06Q 30/0246 |
| 2016/0232540 A1* | 8/2016 | Gao | .................... | G06Q 30/0201 |
| 2016/0321561 A1* | 11/2016 | Roder | .................... | G06N 20/00 |
| 2017/0091671 A1* | 3/2017 | Mitarai | ................. | G06F 16/285 |
| 2017/0154279 A1* | 6/2017 | Aharonov | .............. | G06N 20/00 |
| 2017/0193392 A1* | 7/2017 | Liu | ........................ | G06N 20/00 |
| 2017/0293857 A1* | 10/2017 | Stajner | .................... | H04L 67/10 |
| 2017/0364822 A1* | 12/2017 | Davis | ..................... | H04L 67/06 |
| 2018/0024859 A1* | 1/2018 | Doshi | .................... | G06N 20/00 718/104 |
| 2018/0053210 A1* | 2/2018 | Modarresi | .......... | G06Q 30/0251 |
| 2018/0060738 A1* | 3/2018 | Achin | ............... | G06Q 30/0201 |

OTHER PUBLICATIONS

Deng,"Gene Selection with Guided Regularized Random Forest", Pattern Recognition 46(12):, Jun. 21, 2013, 21 pages.

Deng,"Guided Random Forest in the RRF Package", Source: arXiv, Nov. 18, 2013, 2 pages.

Freund,"A Short Introduction to Boosting", Journal of Japanese Society for Artificial Intelligence, 14(5), Sep. 1999, 14 pages.

Zhu,"Multi-class AdaBoost", Jan. 12, 2006, 21 pages.

\* cited by examiner

SEGMENT VALUATION IN A DIGITAL MEDIUM ENVIRONMENT

BACKGROUND

Segments are used to define a subset of a user population. This is often used to support underlying functionality of digital marketing systems, such to target digital marketing content to different subsets of a user population defined using different segments. Segments of a user population may be defined in a variety of ways through use of attributes. Attributes include any measurable feature involving user interaction with digital content, including demographics of a user such as age, geographic location, hardware or software used to perform the interaction, and so forth. In a first example of a segment definition, the segment is rule based by specifying different attributes (i.e., features) of users to define membership in the segment. In a second example of segment definition, the segment is model based, such as to form a cluster of users for inclusion in a segment, e.g., through k-means clustering.

Valuation of a segment involves quantifying achievement of the subset of the user population defined by the segment in relation to a metric. For the digital marketing example above, for instance, the metric involves conversion of a good or service. Therefore, valuation of the segment in a digital marketing example may be based on a conversion rate of users in the segment. However, accuracy and efficiency of arriving at a valuation for the segment is hindered by the high dimensional space that supports combinations of hundreds of thousands of different attributes that are usable to define the segment. Consequently, this may hinder techniques that rely on segmentation and valuation of these segments, such as to target digital marketing content based on a likely value of the segment towards conversion of a particular good or service.

SUMMARY

Segment valuation techniques usable in a digital medium environment are described that have improved accuracy in the valuation of the segment as well as improved efficiency in determination of this value. To do so, a segment valuation system first identifies the attributes that are significant in achievement of a desired metric (e.g., conversion) and then values segments based on those significant attributes.

To begin, attributes are selected from a trained model based on significance of those attributes towards achieving a desired metric, e.g., conversion. A valuation of a segment is then calculated based on the valuations of these attributes. For example, inclusion of the selected attributes within a segment, and the valuations of those selected attributes, is then used by the segment valuation system to generate data describing a value of the segment towards achieving the metric. In this way, the value may be used to quantify an effect of the segment towards achieving a desired metric, e.g., conversion in a digital marketing scenario.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
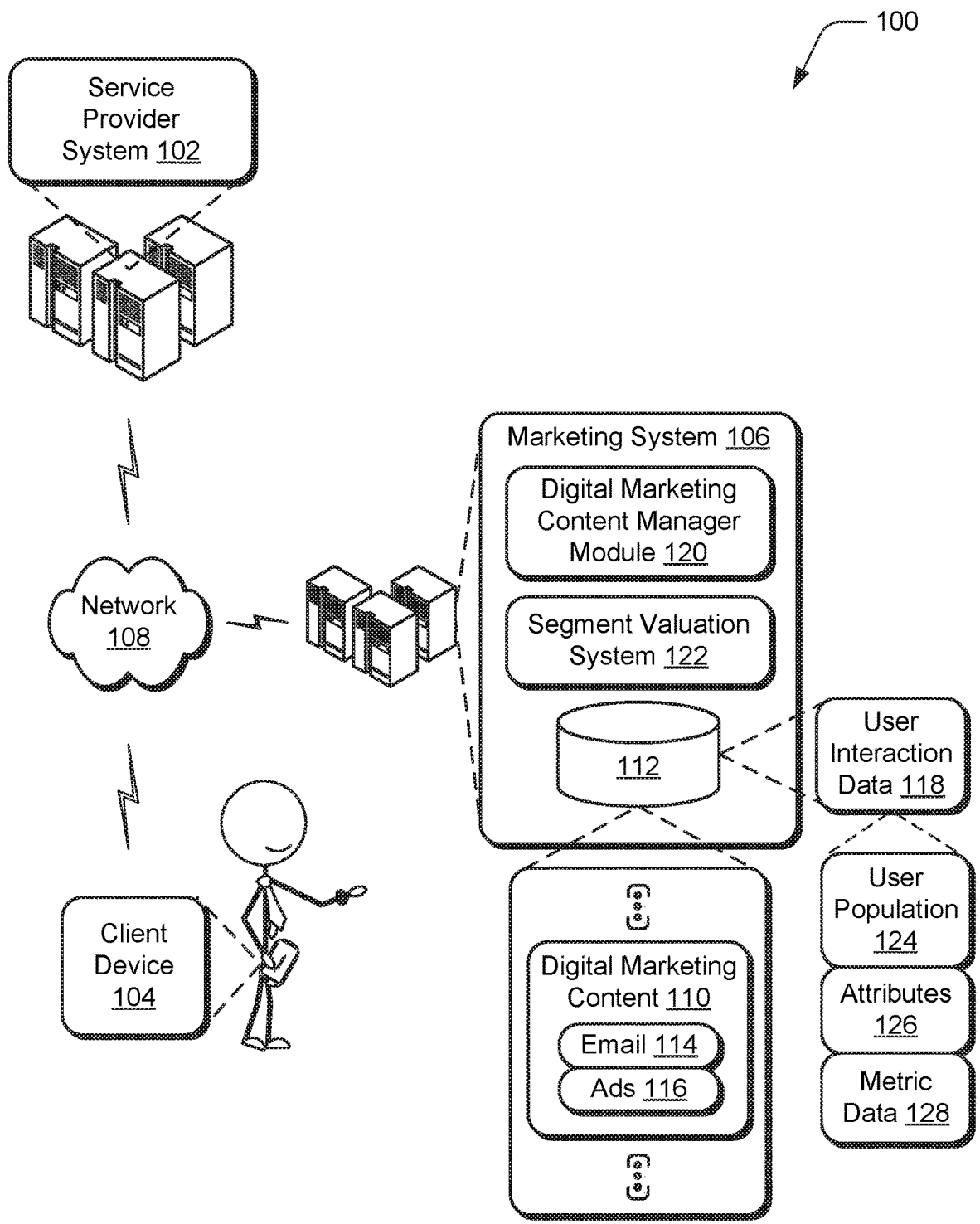
FIG. 1 is an illustration of an environment in an example implementation that is operable to employ segment valuation techniques described herein.

Digital marketing systems are configured to provide digital marketing content (e.g., banner ads, emails, and so forth) to a user population to increase a likelihood of conversion of a good or service by the user population. As part of this, segments are formed as subsets of the user population that are to receive the digital marketing content. The segments are defined using attributes, which include any measurable feature involving user interaction with digital content. As previously described, this may be rule based (e.g., a defined set of attributes) or model based through use of a clustering technique.

Valuation of segments involves determining a value of the segment towards achieving a metric, which in a digital marketing scenario above involves conversion of a good or service. Accordingly, the valuation of the segment serves as a basis to control provision of digital marketing content in a manner that is efficient to a subset of the user population that receives the digital marketing content as well as a provider of the digital marketing content. These efficiencies result from likely susceptibility of the subset of the user population toward receipt of the digital marketing content and focus of the provider the digital marketing content on this subset. As such, conventional difficulties in arriving at an accurate valuation for segments may also hinder efficiency in provision of subsequent digital marketing content and resulting conversion of goods or services.

Segment valuation techniques usable in a digital medium environment are described that have improved accuracy in the valuation of the segment as well as efficiency in determination of this value. To do so, a segment valuation system first identifies the attributes that are significant in achievement of a desired metric (e.g., conversion) and then values segments based on those significant attributes. For example, user interaction data is first obtained that describes a user population, attributes associated with users of the user population, and behavior of the users of the user population regarding a metric, e.g., conversion. This user interaction data is then employed by a segment valuation system to train a model using machine learning. In an implementation, this training is supervised such that the model is trained to achieve a known outcome for the business metric as defined by the user interaction data, e.g., a specific conversion rate for the user population.

Attributes are selected from the trained model based on significance of those attributes towards achieving the desired metric. In other words, the attributes are selected based on a relatively higher or lower value towards attaining a goal defined by the metric. This may be based on a score calculated for each attribute indicating significance toward the metric, such as for a score over a specified threshold, a predefined number of attributes having the highest scores, one to another, and so on. In this way, a valuation of the attributes is achieved based on significance of those attributes toward achieving the metric as indicated by the trained model.

A valuation of a segment may then be calculated based on the valuations of these attributes. Continuing with the previous example, the selected attributes are a subset of the attributes included in the user interaction data, i.e., the data used to train the model. Inclusion of the selected attributes within a segment, and the valuations of those selected attributes, is then used by the segment valuation system to generate data describing a value of the segment towards achieving the metric. In this way, efficiency in valuation of the segment may be drastically improved (e.g., from almost an hour to a matter of minutes or seconds) and accuracy in the valuation may also be improved, e.g., by reducing and even eliminating an effect of attributes that merely contribute noise to the valuation. Further discussion of these and other examples is included in the following sections.

Terms

"Segments" are used to define a subset of a user population. In a first example, the segments are rule based by specifying different attributes (i.e., features) of users to define membership in the segment. In a second example segment definition, the segment is model based, such as to form a cluster of users for inclusion in a segment, e.g., through k-means clustering.

"Attributes" include any measurable feature involving user interaction with digital content. Examples of attributes include demographics of a user such as age, geographic location, hardware or software used to perform the interaction, and so forth.

"Valuation of a segment" involves quantifying achievement of the subset of the user population defined by the segment in relation to a metric. For a digital marketing example, the metric involves conversion of a good or service. Any other metric may also be used as a basis for valuation of the segment.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a service provider system 102, client device 104, marketing system 106, that are communicatively coupled, one to another, via a network 108.

Computing devices that are usable to implement the service provider system 102, client device 104, and marketing system 106 may be configured in a variety of ways. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 102 is representative of functionality to provide services accessible via a network 108 that are usable to make products or services available to consumers. The service provider system 102, for instance, may expose a website or other functionality that is accessible via the network 108 by a client device 104. The client device 104, for instance, may employ a browser, network-enabled application, and so on that obtains data from the service provider system 102 via the network 108. This data is employed by the client device 104 to enable a user of the client device 104 to communicate with the service provider system 102 to obtain information about the products or services as well as purchase the products or services.

In order to promote the products or services, the service provider system 102 may employ a marketing system 106. Although functionality of the marketing system 106 is illustrated as separate from the service provider system 102, this functionality may also be incorporated as part of the service provider system 102, further divided among other entities, and so forth. The marketing system 106 is implemented at least partially in hardware of a computing device to control provision of digital marketing content 110 for consumption by users, which is illustrated as stored in storage 112. The digital marketing content 110 is provided to a user of the client device 104 to cause conversion of products or services of the service provider system 102.

The digital marketing content 110 may assume a variety of forms, such as email 114, advertisements 116, and so forth. The digital marketing content 110, for instance, may be provided as part of a digital marketing campaign to a plurality of users of computing devices. User interaction data 118 may then be generated based on interaction of these users with the digital marketing content 110 to describe which users received which items of digital marketing content 110 (e.g., from particular marketing campaigns) as well as attributes of this interaction. Attributes include any measurable feature involving user interaction with digital content. From this user interaction data 118, a digital marketing content manager module 120 may control which items of digital marketing content 110 are provided to a subsequent user, e.g., a user of client device 104, in order to increase a likelihood that the digital marketing content 110 is of interest to the subsequent user.

Part of the functionality usable to control distribution of the digital marketing content 110 is represented by a segment valuation system 122. The segment valuation system 122 is implemented by a computing device of the marketing system 106 to generate data describing a value of a segment (i.e., a subset of a user population) towards achieving a desired metric, such as conversion in this digital marketing scenario. To do so, the segment valuation system 122 processes user interaction data 118 that describes a user population 124 (e.g., identifies users including in the user population), attributes 126 associated with the user population), and metric data 128 which describes achievement of the metric by the users of the user population 124, e.g., conversion rate. From this, the segment valuation system 122 determines significance of individual ones of the attributes 126 towards achieving the metric and then selects a subset of the attributes 126 based on this significance. In this way, the segment valuation system 122 may reduce the number of attributes 126 from hundreds of thousands to less than one hundred, e.g., five.

The selected attributes and corresponding valuations based on the significance of the attributes 126 towards achieving the metric are then employed by the segment valuation system 122 to arrive at a value of a segment. For example, the segment valuation system 122 may determine which of the selected attributes (i.e., the subset of attributes) are included in the segment. From this, a value for the segment is determined based on valuations (i.e., significance) of the included selected attributes in the segment. In this way, through use of the reduced subset of selected attributes, valuations of segments may be obtained in an efficient manner with reduced computational resources, which in some instances may reduce processing time from multiple hours to a matter of minutes and seconds. An example of operation of the segment valuation system 122 is described in greater detail in the following section.

Example Operation of the Segment Valuation System

Figure 2:
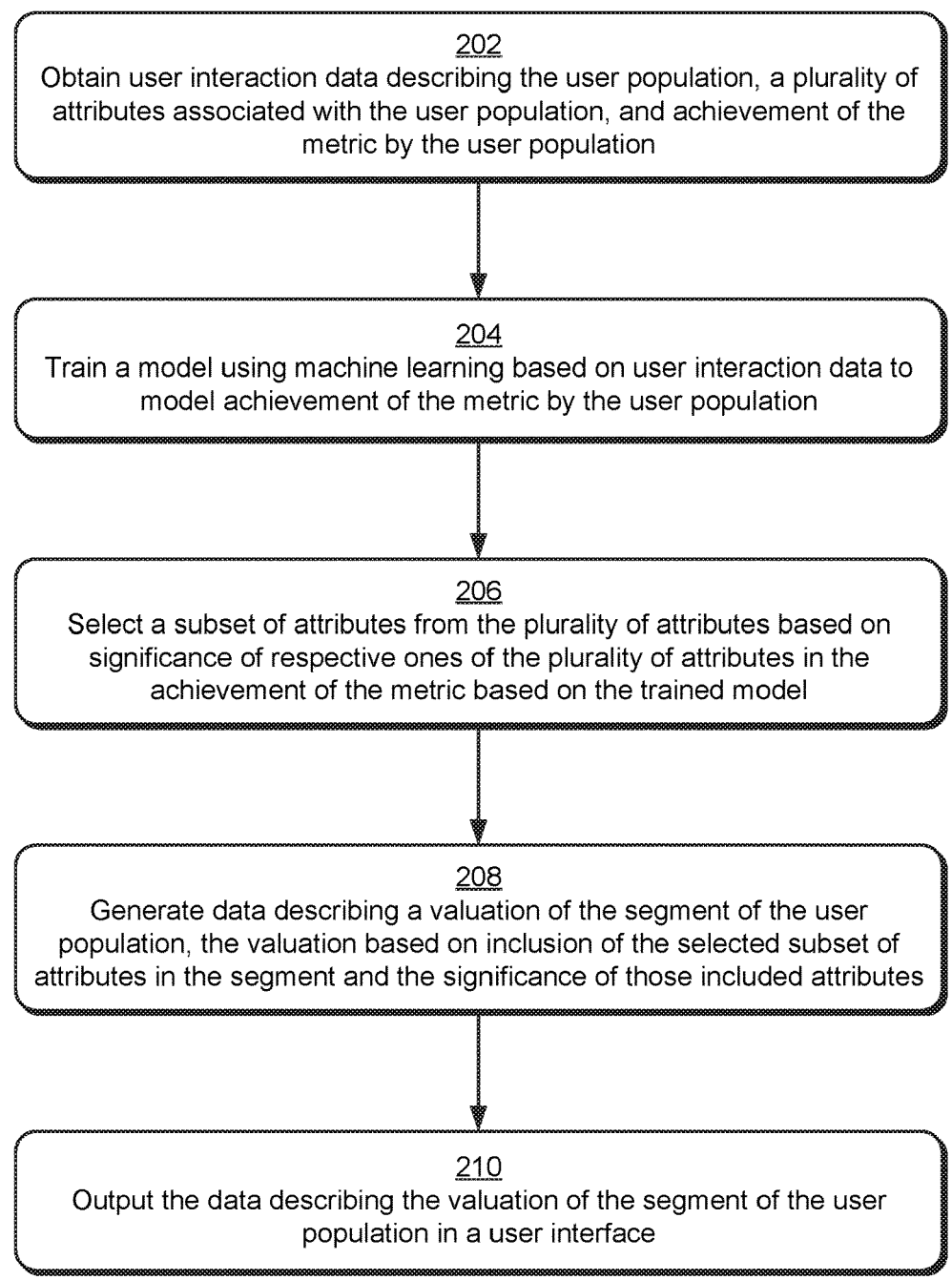
FIG. 2 is a flow diagram depicting a procedure in an example implementation in which a segment is valued based on a valuation of a subset of attributes arrived at using machine learning.
Figure 3:
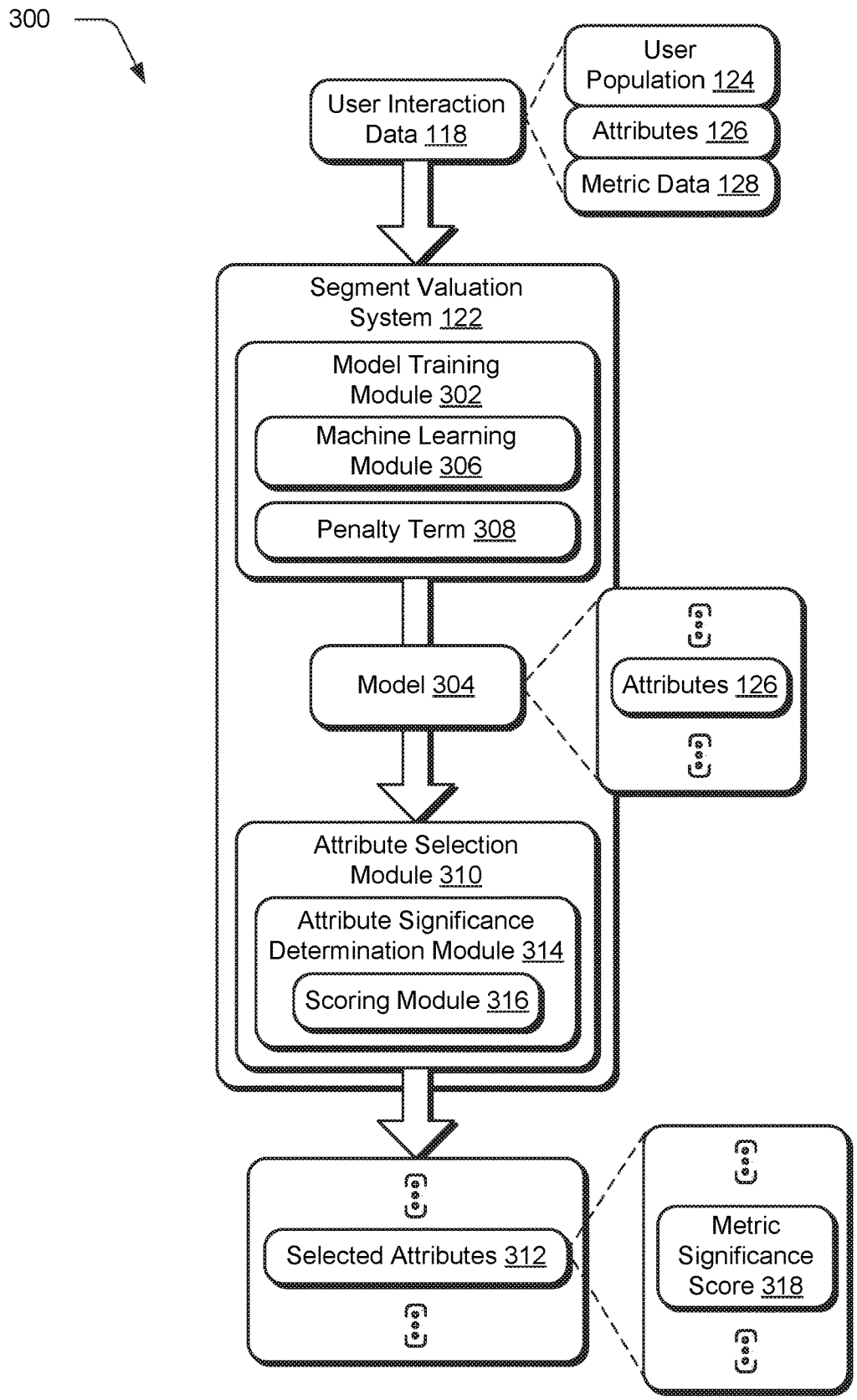
FIG. 3 depicts a system in an example implementation in which a subset of attributes is selected based on significance of those attributes towards achievement of a metric based on a model trained using machine learning.
Figure 4:
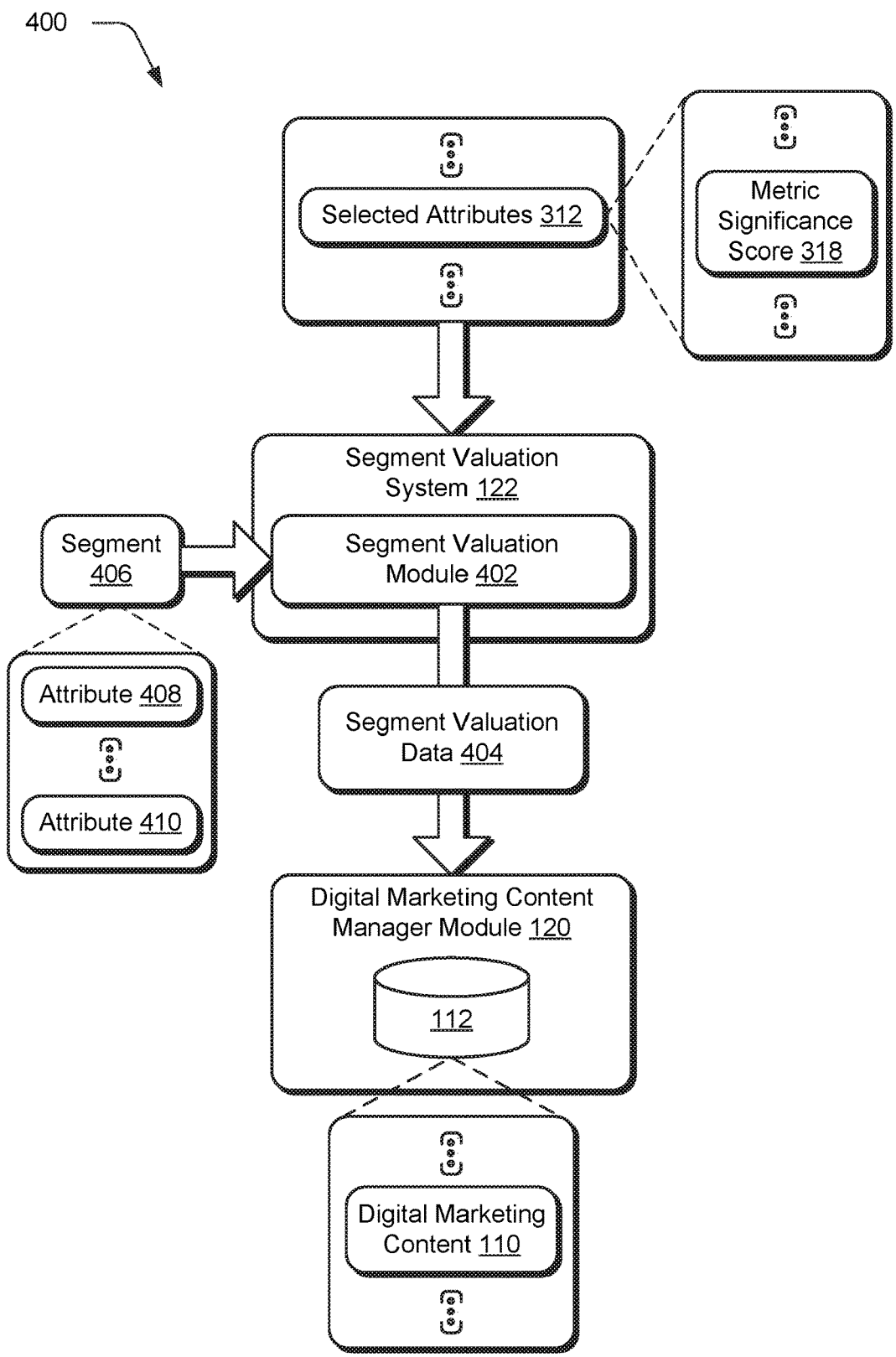
FIG. 4 depicts a system in an example implementation in which valuations of selected attributes based on significance towards achievement of the metric are used to generate data describing a value of a segment as a subset of a user population towards achieving the metric.

FIG. 2 depicts a procedure 200 in an example implementation in which a segment is valued based on a valuation of a subset of attributed arrived at using machine learning. FIG. 3 depicts a system 300 in an example implementation in which a subset of attributes is selected based on significance of those attributes towards achievement of a metric based on a model trained using machine learning. FIG. 4 depicts a system 400 in an example implementation in which valuations of selected attributes based on significance towards achievement of the metric are used to generate data describing a value of a segment as a subset of a user population towards achieving the metric.

User interaction data 118 is obtained that describes users of a user population 124, a plurality of attributes 126 associated with the user population, and data describing achievement of the metric 128 by the user population (block 202). The user interaction data 118 may be obtained from a variety of sources, such as from a distributor of digital content such as a web service system, a data aggregator that is configured to collect this data from user interaction with third-party systems such as an analytics service system, and so forth.

As previously described, the user interaction data 118 identifies a user population 124, e.g., identifies users included in the user population. This identification may be abstracted to uniquely identify the users without indicating actual user identities, e.g., user names.

The user interaction data 118 also describes attributes 126 associated with the user population 124. Attributes 126 include any measurable feature involving user interaction with digital content. Attributes 126 are also referred to as features, variables, and predictors. This may include attributes of the users themselves, such as demographics (e.g., age, gender, nationality), physical locations of the users, and so forth. The attributes 126 may also describe characteristics of software (e.g., mobile applications, browsers, or webpages) and/or hardware (e.g., network, processing, and memory) of respective computing devices employed by the users to interact with digital content. Thus, hundreds of thousands of different attributes 126 may be included in the user interaction data 118 to describe features of the user population 124.

The user interaction data 118 also includes metric data 128. The metric data describes achievement of the metric by the users of the user population 124. The metric data 128, for instance, may be binary, such as to indicate whether a metric of conversion occurred or did not occur for a respective user of the user population 124. In another instance, the metric data 128 is continuous, such as to describe a conversion rate, dollar amount of conversion, and so forth. Although conversion is described as an example of a metric, an effect of attributes on a variety of other metrics may also be employed. For example, any quantifiable measure that is usable to track and assess status of a specific process whether business or otherwise may be used, such as financial metrics, sales metrics, marketing metrics, and so forth.

A model is trained using machine learning based on user interaction data to model achievement of the metric by the user population (block 204). The model training module 302, for instance, may use machine learning to train a model 304 using the user interaction data 118. In an implementation, the training of the model 304 is supervised such that the training is performed to achieve or approximate a known result, such as a particular conversion rate as specified by the user interaction data 118.

Functionality to train the model 304 using machine learning is represented as a machine learning module 306. A variety of different machine learning techniques may be employed to train the model 304. Examples of which include a linear model penalized with L1 normal regularization (Lasso), a random forest, a guided random forest, an adaptive boosting ensemble model (AdaBoost), or gradient boosted trees (GBRT) as further described in the Implementation Example section below.

The model training module 302 may also incorporate a penalty term 308 that is configured to adjust a tradeoff between accuracy of the model 304 and complexity of the model 304 to reduce or prevent overfitting or under fitting of the model 304 to the user interaction data. Overfitting occurs when the model 304 is overly accurate and fits the user interaction data 118 too well such that noise is captured. This results in low bias but high variance such that the model 304 may not accurately reflect subsequent user interaction data 118. Overfitting, for instance, may be detected by dividing the user interaction data 118 in two or more portions. A model that is trained using one portion that then does not accurately reflect another portion of the data is considered as over fit and thus overly complex.

On the other hand, under fitting occurs when the model 304 does not capture an underlying trend of the data and thus is not complex enough and "under fits" the user interaction data 118. Accordingly, the segment valuation system 122 may employ a penalty term 308 to balance accuracy and complexity of the model 304 through regularization. This may be performed automatically by the model training module 302 through adjustment of the penalty term 308 through successive training iterations using different portions of the user interaction data 118. The penalty term 308 may also be user specified, such as through interaction with a user interface of the model training module 302.

Once trained, the model 304 represents how attributes 126 of the user population 124 affect achievement of the metric, e.g., conversion. From this, a subset of attributes is selected from the plurality of attributes 126 based on significance of respective ones of the plurality of attributes in the achievement of the metric based on the trained model (block 206). An attribute selection module 310, for instance, is implemented by a computing device to select attributes 312 from the attributes 126 of the trained model 304. This selection is based on a determination of significance in respective ones of the attributes 126 in the achievement of the metric by the model 304 by an attribute significance determination module 314.

In one example, significance of the attributes 126 is quantified by a scoring module 316. The scoring module 316 is representative of functionality to generate a metric significance score 318 that quantifies an effect of respective attributes 312 on achievement of the metric. The attribute significance determination module 314, for instance, may be configured to adjust a weighting of each of the attributes in the model 304 to determine a relative effect of the attributes on the achievement of the metric. The metric significance score 318 thus defines how well the model 304, having these changed weights, fits the user interaction data 118.

In one example, the scoring module 316 employs an F-test to generate the metric significance score 318 as an F-score. An F-test is a statistical test to compare models 304 (e.g., models as having the differently weighted attributes 126) to determine which model best fits the user interaction data 118 through use of an F-score. Accordingly, the F-score describes significance of respective attributes towards the achievement of the metric as represented by the model 304.

Accordingly, the attribute selection module 310 selects a subset of the attributes 126, illustrated as the selected attributes 312, based on this described significance. This may be performed by the attribute selection module 310 to select a specified number of attributes 126 as ranked using the metric significance scores 318. This may also be performed to achieve a desired accuracy in modeling of the achievement of the metric using those selected attributes, e.g., to select a number of attributes that together capture a desired amount of the original information in the model 304.

In a further example, a user interface is output having a listing (e.g., ranked list) of attributes and corresponding metric significance scores 318. A user input may then be received caused by user interaction with this user interface to select which attributes 126 are to form a set of selected attributes 312. Thus, at this point the attributes 126 have a defined value as based on the metric significance score 318, which is then used to select a subset of the attributes 126 (e.g., illustrated as selected attributes 312). The selected attributes 312 and corresponding metric significance score 318 are then used to generate a value for segments having those attributes as shown in the system 400 of FIG. 4.

Data is then generated describing a valuation of the segment of the user population. The valuation is based on inclusion of the selected subset of attributes in the segment and the significance of those included attributes (block 208). As illustrated in FIG. 4, for instance, the segment valuation system 130 includes a segment valuation module 402. The segment valuation module 402 is implemented via a computing device to generate segment valuation data 404 that describes a value of a segment 406 in achieving a desired metric, such as conversion or other business or non-business metric. To do so, the segment valuation module 402 determines which attributes 408, 410 are included in the segment 406 to be valued. The segment valuation module 402 then determines which of these attributes 408, 410, if any, correspond to the selected attributes 312. In other words, the segment valuation module 402 determines if the segment 406 includes any of the selected attributes 312. If so, the segment valuation module 402 generates segment valuation data 404 that describes a value for the segment 406 based on values of the selected attributes 312 that are included in the segment from respective metric significance scores 318. The generated data is then output that describes the valuation of the segment of the user population in a user interface (block 210).

In this way, a valuation may be generated for each of a multitude of segments 406, which is not possible using conventional techniques that are confronted with hundreds of thousands of different attributes. This may be used to support a variety of functionality, such as for use by a digital marketing content manager module 120 to target provision of digital marketing content 110 to particular segments of the user population. As previously described, other metrics and uses of valuations of segments as achieving these metrics may also leverage the techniques described herein. In the following section, an implementation example is described in which a variety of different techniques to perform machine learning are compared to model achievement of a metric and select attributes based on respective contributions towards this achievement.

Implementation Example

As described above, the segment valuation system 122 first determines a value for attributes 126 and then uses results of the valuation to determine a value of segments having these attributes. Therefore, in the following discussion generation of a value for individual attributes is first described which is then followed by a description of use of those values to generate a value for a segment, i.e., a subset of a user population, in achieving a metric such as conversion.

In this example, the user interface data 110 includes 216,064 instances of user interactions that pertain to a desired metric (e.g., conversion) and one hundred and nine attributes 126 associated with those interactions. This data is divided between training and testing for cross validation, e.g., to test overfitting and under fitting of the model 304. Class weights are adjusted to be inversely proportional to the number of examples in the training set for a given class in order to maintain balance between a disparity in a number of positive examples (e.g., users that converted) and negative examples (e.g., users that did not convert).

In this implementation example, different types of machine learning techniques are employed by the machine learning module 306 in order to train the model to represent achievement of the metric by the user population. Examples of these different types are included in respective sections in the following discussion.

Lasso/Randomized Lasso Machine Learning Technique

Lasso is a machine learning technique that may be employed by the machine learning module 306 to train the model 304. Lasso employ regression analysis to select attributes and employ regularization to enhance accuracy of the model 304. Lasso is also referred to as linear models penalized with L1 norm regularization, which have sparse solutions where many of the coefficients are set to "0." As a result, such models may serve as a baseline technique to select attributes 126. In the above dataset, a testing portion F-score of 0.28951760635 and a training portion F-score of 0.295138609883 for the portions of the user interaction data 118. This indicates that the model 304 formed using Lasso under fit the user interaction data 118. The model 304 is used to select eleven attributes.

When faced with a group of correlated attributes, lasso machine learning techniques tend to select a single one of those attributes. To address this problem, the lasso technique may be randomized whereby the sparse model is re-estimated several times through subsampling of the user interaction data 118. As a result of this, seventeen attributes are selected in this example as shown in table 500.

Random Forest Machine Learning Technique

Traditional and guided random forests may also be employed by the machine learning module 306 to train the model 304. Traditional random forest machine learning techniques generate an ensemble model formed of a multitude of decision trees (i.e., sub-models), each of which is exposed to a random sample (with replacement) of the user interact data. A decision-tree splitting metric (e.g., Gini impurity) that is used conventionally to determine when to branch decision trees may also be employed as the criterion for scoring attributes. Thus, random forests may be used to efficiently locate significant attributes and may be parallelized across multiple cores to improve computational efficiency. In an example implementation, ten thousand decision trees are used in a random forest to ensure statistically robust results, which took five minutes to train. In the above example of user interaction data, an F-score of 0.983909214 is achieved. Attributes are selected having a Gini impurity score that are at least one standard deviation above a mean score. This resulted in selection of five attributes, which are sorted by decreasing order of Gini impurity score in table 500.

Random forest machine learning techniques are statistically robust, but have a tendency to over fit. As a result, regularized random forests (RRF) may be configured to address this potential disadvantage, e.g., through use of a penalty term as previously described. In the first run of a regularized random forests, this machine learning technique obtained a F1-Score of 0.967212 and selected fifty-nine features, many of which were highly correlated. To solve this, the Gini Impurity measure obtained in the regularized random forests may be used to guide the RRF into selecting attributes that have considerably improved the overall performance and reduced a number of attributes selected to ten without affecting the F-score (0.967896).

Figure 5:
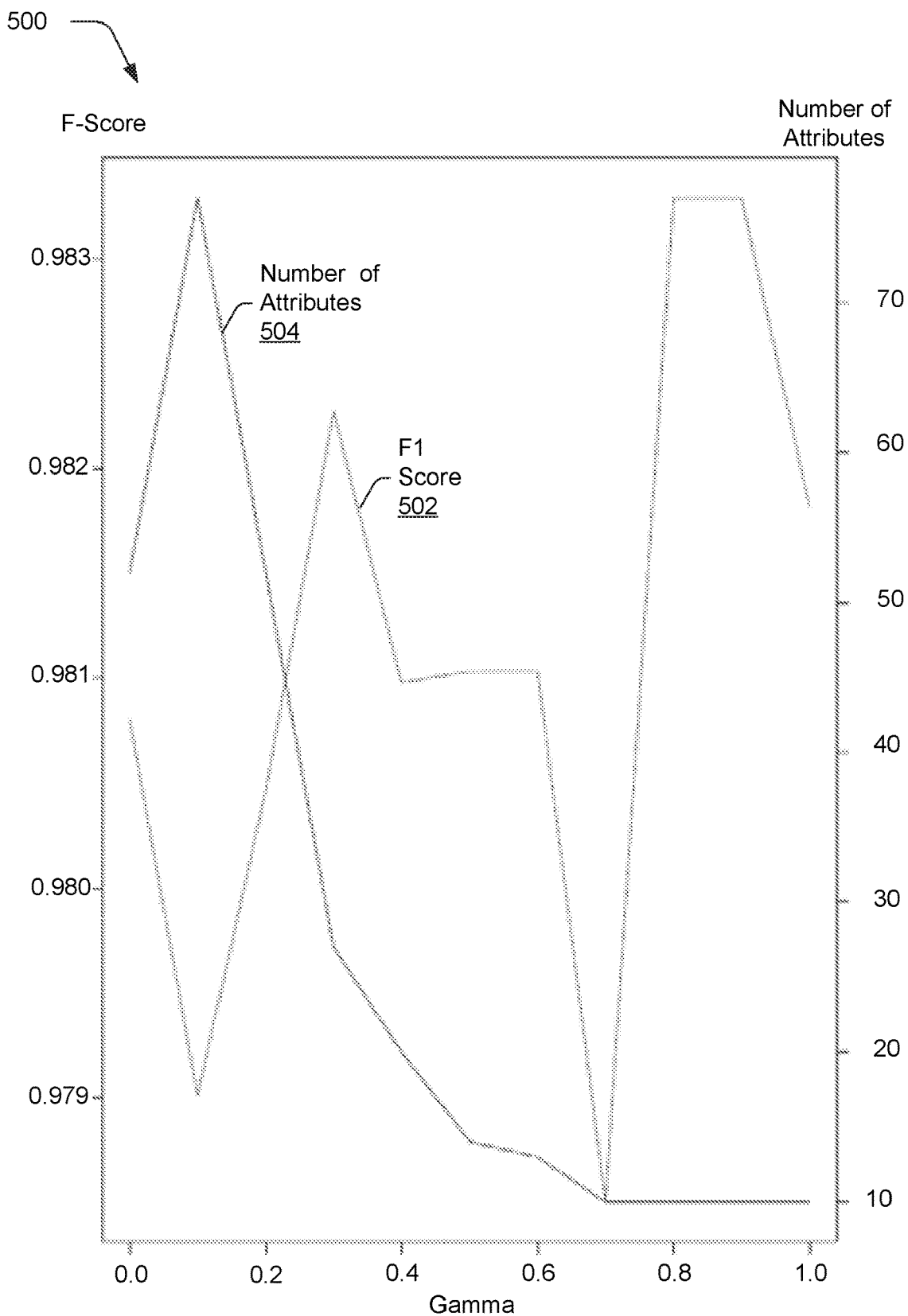
FIG. 5 depicts an example implementation showing results of a gamma sweep.

If left by default, a penalty term 308 (e.g., regularization parameter "coefReg") assigns the same weight to each of the attributes, with a default of 0.8. In a guided regularized random forest (G-RRF), the regularization parameter of each attribute is proportional to significance (e.g., importance) as follows:

$$coefReg_i = (1 - \gamma) + \gamma * \frac{Imp_i}{Imp_{max}}$$

where "$\gamma \varepsilon [0,1]$" is a tuning parameter that establishes a degree of importance (e.g., significance) and resulting penalization. A scenario in which "$\gamma=0$" corresponds to an unguided RRF, as every variable has the same weight. A scenario in which "$\gamma=1$" is the most penalizing and thus results in the least amount of selected attributes. To tune the "$\gamma$" parameter, a sweep test technique may be employed to identify a value that maximizes the F1-score while minimizing the number of features. An example of result of a sweep test technique are shown in a plot 600 of FIG. 5 in which an FI score 502 is compared with a number of attributes 504. From this, an optimal value of Gamma may be identified as "0.8," as it provides a maximum F-score and a minimum number of features.

Adaptive Boosting

Adaptive Boosting (AdaBoost) is an ensemble machine learning technique that combines weak learners (e.g., sub-models that describe a limited portion of the user interaction data 110) to form a weighted sum. Adaboost is adaptive since the next weak learner is weighted in favor of classifying previously misclassified samples.

For the weak classifiers, decision trees are employed to support efficient classification. In this implementation, ten thousand "weak learners" sub-models are used to form an ensemble model for better convergence of the technique.

As previously described, since the user interaction data is unbalanced (e.g., large differences in numbers of users that converted versus numbers of users that did not), a constraint is employed that the decision trees are balanced for weak learners. This improved F1 and accuracy scores from 0.20328620557890717 to 0.821604162928404 and 0.91678971943967758 to 0.962078619542746, respectively. This addresses the problem of unbalanced decision trees that result in a large number of false negatives by predicting that most users did not convert.

In contrast with the random forest methods, Adaboost is several magnitudes faster, e.g., took approximately three seconds to process the user interaction data 118. When comparing the attributes selected by AdaBoost with the other techniques as shown in table 500, the attributes are similar, sharing nine out of the top eleven attributes with RRF and G-RRF, though attributes may not be in the exact same order. The attributes are selected having a score indicating significance of at least one standard deviation above a mean score.

Gradient Boosted Trees

Gradient boosted trees (GBRT) are a generalization of boosting to arbitrary differentiable loss functions. The advantages of GBRT include their predictive power and robustness to outliers, while their primary disadvantage is that GBRTs are difficult to parallelize. In this example implementation, one thousand decision trees are used as part of GBRT with a learning rate of 0.1. Training of the model took approximately nine minutes, and resulted in an F-score of 0.38965697631 for a test portion of the user interaction data and an F-score of 0.451862529398 for a training portion of the user interaction data. This indicates that this model also under fits the user interaction data.

The number of features selected by the RF, G-RRF and AdaBoost are around ten. On the tests performed afterwards where the segment valuation system trained the model using the top five attributes, the model 304 retained its accuracy. Therefore, it can be concluded that the top five attributes are representative enough of an entirety of the attributes 126 and could be selected without loss of precision to improve computational efficiency.

Segment Valuation

After computing the value of each attribute, those results and valuations are used to compute a value for a segment. In a scenario in which knowledge of user conversion is unknown, a set of set of relevant features found by the random forest in the above techniques may be used to guide a determination of value for a segment 406. For example, suppose the attributes "$x=[x_1, \ldots, x_m]$" are determined to be most significant in predicting whether a given user will convert or not. Furthermore, suppose the segment valuation module 402 receives "k" segments, "$S_1, \ldots, S_k$," where each segment "$S_i$" has its own (potentially different) set of attributes "$a^{(i)}=[a_1^{(i)}, \ldots, a_n^{(i)}]$." For each "$i=1, \ldots, k$," both "x" and "a$^{(i)'}$" may be projected into the same space by concatenating these variables as a single matrix "M." By performing PCA (principal components analysis) on "M," the dimensionality of "x" and "a$^{(i)'}$" are reduced to their corresponding "x'" and "a$^{(i)''}$". Now that "x'" and "a$^{(i)''}$" are comparable via "x'" and "a$^{(i)''}$", "x'" and "a$^{(i)''}$" can be compared in a variety of ways, such as via a Pearson correlation coefficient or via Jaccard or cosine similarity. The segment with the highest metric of comparison is then chosen as the most significant segment to achieving the metric, as its attributes are more related to the attributes "x" found in valuation for the attributes for determining whether a user will convert.

In an implementation, the output is a list containing the name of the segments with its corresponding valuation. Because user conversion data is available, this may be used as a measure of the accuracy of the segment valuation technique. For example, by applying the available user conversion data, the relative value and significance of each of segment "i" may be calculated as follows:

$$significance_i = \frac{conversions_i}{total\ conversions}$$

A single user may be a member of more than one cluster, so the sum of the significance could be more than one. The dataset used for the test was the unprocessed one, where the membership of each user to each segment is binary.

Example System and Device

Figure 6:
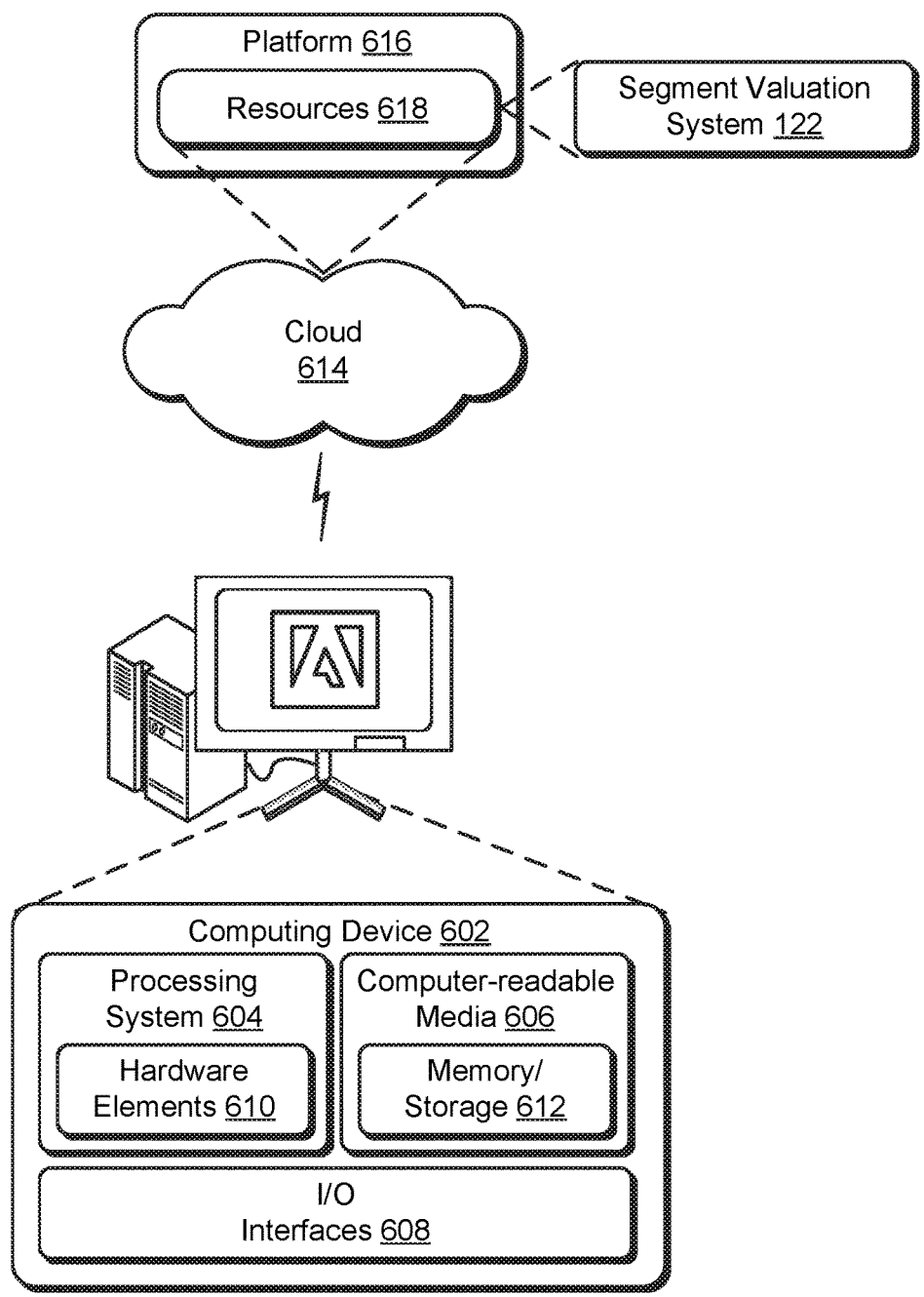
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the segment valuation system 122. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to value a segment of a user population towards achieving a metric, a segment validation system comprising:
    a model training module implemented at least partially in hardware of a computing device to:
        obtain user interaction data, the user interaction data describing the user population, a plurality of attributes associated with the user population, and achievement of the metric by the user population; and
        train a model using machine learning based on the user interaction data to model achievement of the metric by the user population, the model training module employing a penalty term using regularization to reduce overfitting and underfitting of the model to the user interaction data as part of balancing accuracy and complexity of the model, respectively;
    an attribute significance determination module implemented at least partially in hardware of the computing device to determine a significance of respective attributes of the plurality of attributes on the achievement of the metric based on the trained model;
    an attribute selection module implemented at least partially in hardware of the computing device to select a subset of attributes from the plurality of attributes, the selection based on the determined significance; and
    a segment valuation module implemented at least partially in hardware of the computing device to generate data describing a valuation of the segment based on the selected subset of attributes.

2. The system as described in claim 1, wherein the training of the model using machine learning is supervised to train modeling of the achievement of the metric by the user population.

3. The system as described in claim 1, wherein the model is an ensemble model formed using a plurality of sub-models having weighted contributions towards an overall result of the ensemble model to describe the achievement of the metric by the user population.

4. The system as described in claim 1, wherein the machine learning includes a linear model penalized with L1 normal regularization (Lasso), a random forest, a guided random forest, an adaptive boosting ensemble model (AdaBoost), or gradient boosted trees (GBRT).

5. The system as described in claim 1, wherein the attribute selection module selects the subset of attributes from the plurality of attributes based on a respective score generated for each attribute of the plurality of attributes regarding the significance in achieving the metric.

6. The system as described in claim 5, wherein the score defines a measure of accuracy in the significance in achieving the metric.

7. The system as described in claim 6, wherein the score is an F-score that describes significance of respective said attributes towards the achievement of the metric.

8. The system as described in claim 1, wherein the segment valuation module is further implemented to output the generated data in a user interface.

9. The system as described in claim 1, wherein the segment valuation module generates data describing the valuation of the segment of the user population based on the selected subset of attributes independent of use of attributes of the plurality of attributes that are not in the selected subset of attributes.

10. The system as described in claim 1, wherein the metric is conversion defined using a conversion rate or a monetary amount.

11. The system as described in claim 1, wherein the attribute significance determination module is further configured to adjust a weighting of each of the plurality of attributes in the model to determine a relative effect of each of the attributes on the achievement of the metric.

12. In a digital medium environment to value a segment of a user population towards achieving a metric, a method implemented by at least one computing device, the method comprising:
    obtaining, by the at least one computing device, user interaction data describing the user population, a plurality of attributes associated with the user population, and achievement of the metric by the user population;
    receiving, by the at least one computing device, a penalty term specified via user interaction with a user interface;
    training, by the at least one computing device, a model using machine learning based on the user interaction data to model achievement of the metric by the user population, the training employing the penalty term using regularization to reduce overfitting and underfitting of the model to the user interaction data as part of balancing accuracy and complexity of the model, respectively;
    determining, by the at least one computing device, a significance of respective attributes of the plurality of attributes on the achievement of the metric based on the trained model;
    selecting, by the at least one computing device, a subset of attributes from the plurality of attributes, the selecting based on the determined significance;
    generating, by the at least one computing device, data describing a valuation of the segment based on inclusion of the selected subset of attributes in the segment and the determined significance; and
    outputting, by the at least one computing device, the data describing the valuation of the segment of the user population in a user interface.

13. The method as described in claim 12, wherein the selecting is based on a respective score generated for each attribute of the plurality of attributes regarding the significance in achieving the metric.

14. The method as described in claim 13, wherein the score defines a measure of accuracy in the significance in achieving the metric.

15. The method as described in claim 12, wherein the metric defines conversion of a good or service by a respective said user of the user population.

16. The method as described in claim 12, wherein the output data in a user interface includes a ranked list of attributes and corresponding metric significance scores.

17. In a digital medium environment to value a segment of a user population towards achieving a metric, a system comprising:
    means for obtaining user interaction data, the user interaction data describing the user population, a plurality of attributes associated with the user population, and achievement of the metric by the user population;
    means for training a model using machine learning based on the user interaction data to model achievement of the metric by the user population, the training means employing a penalty term using regularization to reduce overfitting and underfitting of the model to the user interaction data as part of balancing accuracy and complexity of the model, respectively, the penalty term generated automatically through adjustment as part of successive training iterations using different portions of the user interaction data;
    means for determining a significance of respective attributes of the plurality of attributes on the achievement of the metric based on the trained model;
    means for selecting a subset of attributes from the plurality of attributes, the selecting based on the determined significance; and
    means for generating data describing a valuation of the segment based on inclusion of the selected subset of attributes in the segment and the determined significance.

18. The system as described in claim 17, wherein the machine learning includes a random forest machine learning techniques or an adaptive boosting ensemble model (AdaBoost).

19. The system as described in claim 17, wherein the selecting means is to select the subset of attributes from the plurality of attributes based on a respective score generated for each attribute of the plurality of attributes regarding the significance in achieving the metric, the score defining a measure of accuracy in the significance in achieving the metric.

20. The system as described in claim 17, wherein the penalty term is adjusted automatically through successive training iterations using different portions of the user interaction data.

* * * * *